Sept. 2, 1930.    R. G. NELSON    1,774,660
METHOD OF MAKING WHEELS
Filed Oct. 6, 1928    3 Sheets-Sheet 1
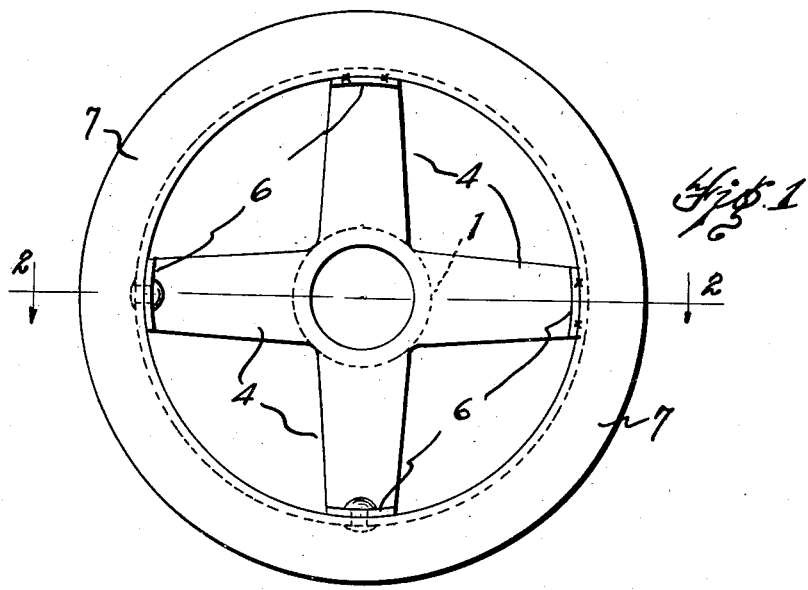
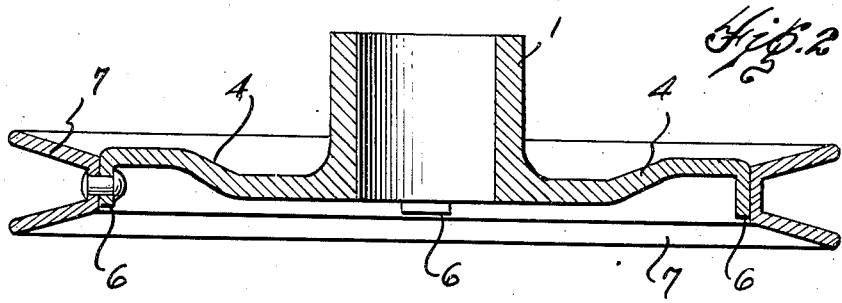
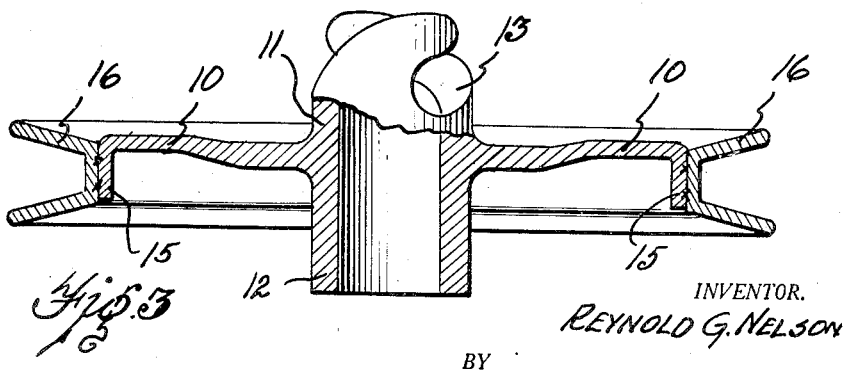
INVENTOR.
REYNOLD G. NELSON
BY
ATTORNEY.

Sept. 2, 1930.  R. G. NELSON  1,774,660
METHOD OF MAKING WHEELS
Filed Oct. 6, 1928   3 Sheets-Sheet 2
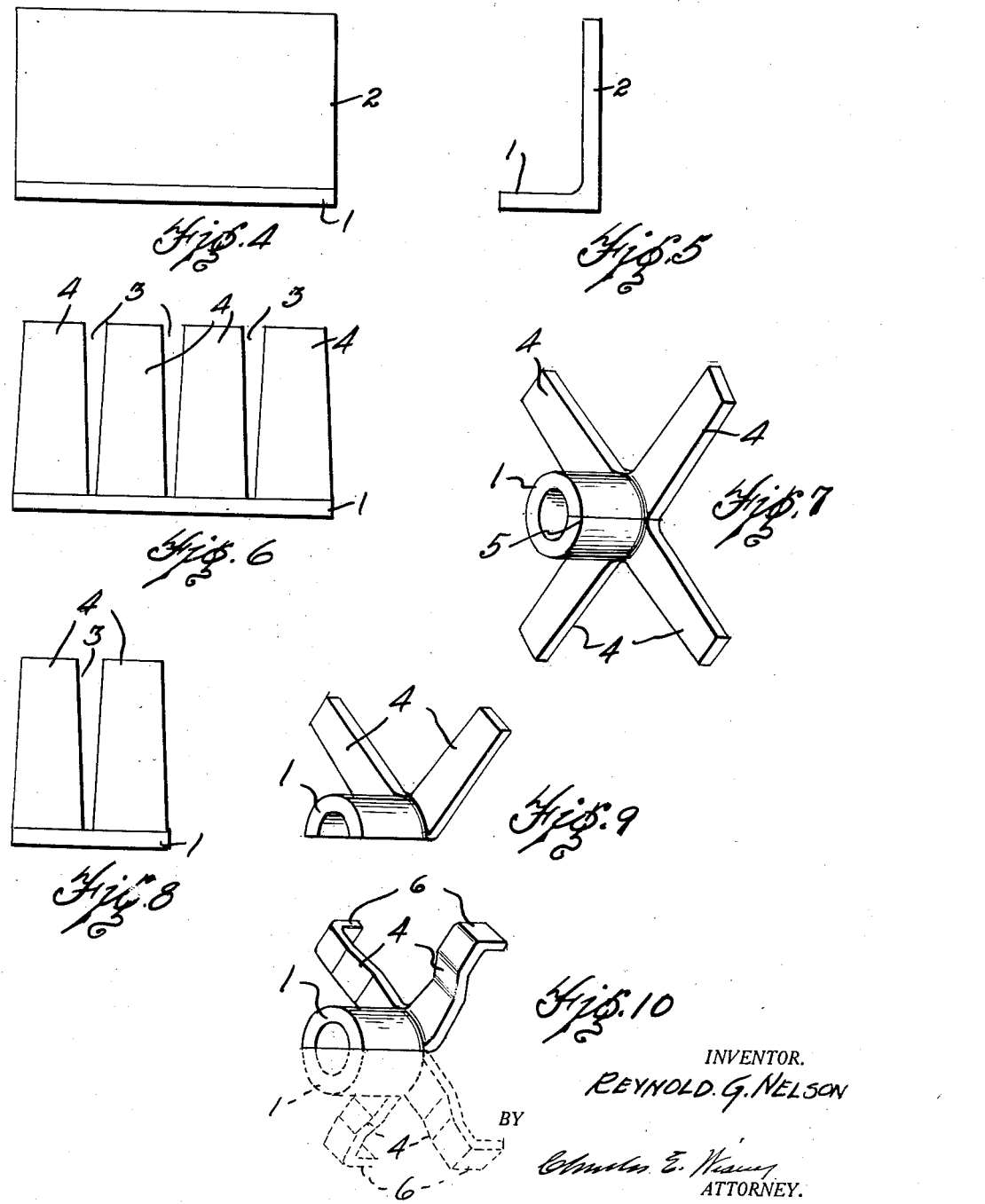
INVENTOR.
REYNOLD. G. NELSON
BY
ATTORNEY.

Sept. 2, 1930.  R. G. NELSON  1,774,660
METHOD OF MAKING WHEELS
Filed Oct. 6, 1928  3 Sheets-Sheet 3
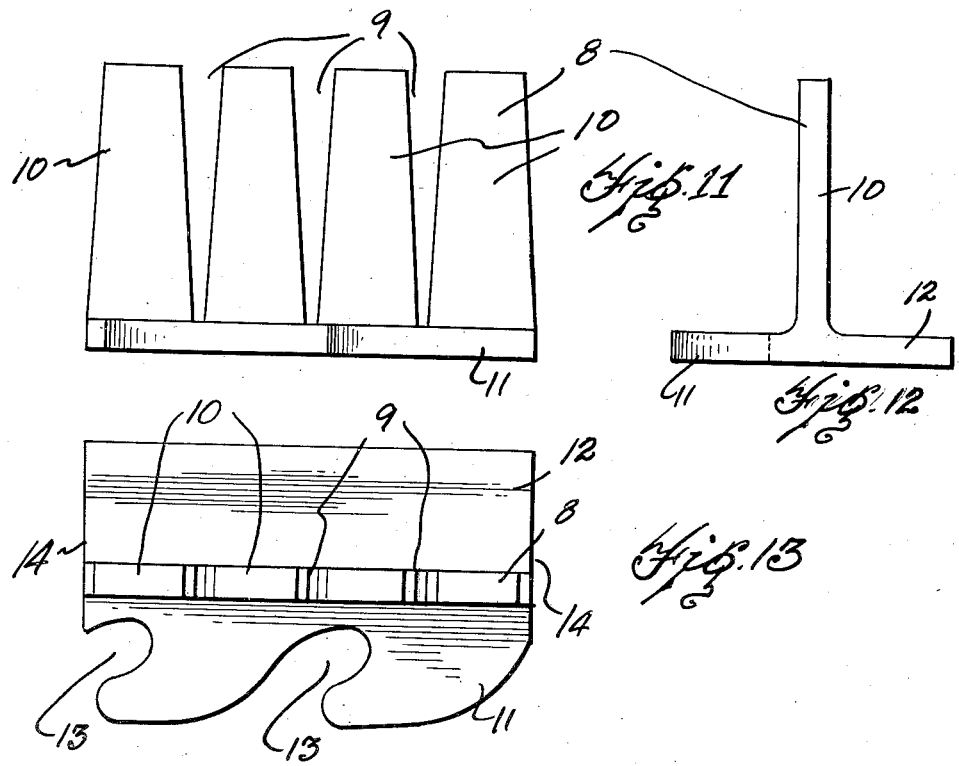
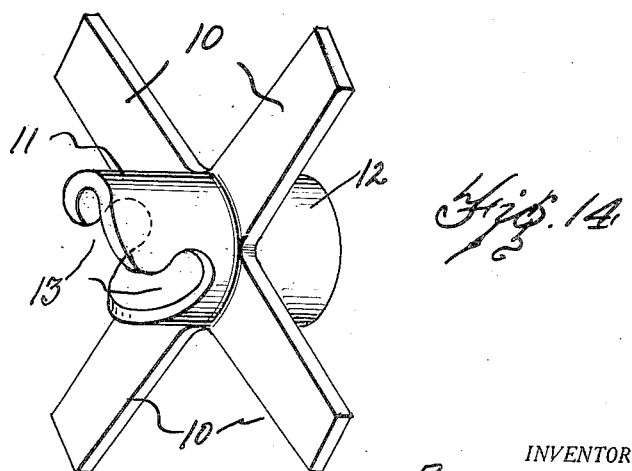
INVENTOR.
REYNOLD G. NELSON
BY
ATTORNEY.

Patented Sept. 2, 1930

1,774,660

UNITED STATES PATENT OFFICE

REYNOLD G. NELSON, OF PONTIAC, MICHIGAN

METHOD OF MAKING WHEELS

Application filed October 6, 1928. Serial No. 310,879.

This invention relates to a method of making a wheel and the object of the invention is to provide a method of forming an integral wheel hub and spoke from an angle iron or T iron blank in which one of the flanges of the wheel is notched or slotted to provide a spoke portion and another flange is turned about an axis with the abutting ends thereof welded to form a cylindrical hub and to spread the spokes.

In utilizing a standard angle or T iron section a superior structure is secured due to the fact that the stock is of greater thickness at the angle of intersection of the flanges and by my method therefore the stock does not thin out at this point to a detrimental extent in the turning of the hub and the spreading of the spokes. By this method an integral hub and spoke portion is secured and a rim may be applied in any desired manner to the spoke sections as by welding or riveting.

These objects and the several novel features of the invention are hereinafter more fully described and claimed and the preferred form of construction by which these objects are attained is shown in the accompanying drawings in which—

Fig. 1 is an elevation of a wheel embodying my invention.

Fig. 2 is an enlarged section taken on line 2—2 of Fig. 1.

Fig. 3 is a similar section showing an alternative form of hub.

Fig. 4 is an elevation of an angle iron blank from which the hub and spider is formed.

Fig. 5 is an end view thereof.

Fig. 6 is a view similar to Fig. 4 showing the blank slotted and ready for forming.

Fig. 7 is a perspective view showing the blank after the rolling operation.

Fig. 8 is a view similar to Fig. 6 showing an alternative form.

Fig. 9 is a perspective view showing the form of Fig. 8 rolled.

Fig. 10 shows the assembly of the two halves.

Fig. 11 shows a T bar blank slotted and notched.

Fig. 12 is an end view thereof.

Fig. 13 is a plan view thereof.

Fig 14 is a perspective view showing the blank after rolling.

In making the wheel hub and spider a piece of angle iron is used as shown in Figs. 4 and 5 consisting of two flanges 1 and 2. The flange 2 is transversely slotted at 3 at spaced intervals to provide the tapered arms 4 as shown in Fig. 6. When this has been done the flange 1 is rolled or bent to tubular form to bring the ends of the flange 1 to abutment at the point 5. In rolling the flange 1 the arms 4 of the spider are turned radially to extend at right angles to each other as shown in Fig. 7.

After the ends of the flange 1 have been brought together at the point 5 the abutting edges are butt welded to hold the device in this form and the arms are formed as shown in cross section in Fig. 2 with downturned ends 6 which may be riveted or spot welded to a pulley rim 7 or any other type of rim or felloe.

In Figs. 8, 9 and 10 a form of the device is shown in which one-half of the hub and spider is formed and then the other half is formed and the two halves are butt welded together as shown to form the completed hub and spider.

In Figs. 11, 12 and 13 a form of the device is shown in which the blank is cut from a T bar. In this form the T bar is provided with an upright flange 8 which is slotted at 9 to form the four arms 10 and at the bottom of this flange 8 is a flange 11 on one side and a flange 12 on the opposite side. The flange 8 is provided with tapered slots as shown in order to provide the tapered arms 10 and the flange 11 is provided with a pair of notches 13 for a purpose hereinafter described. The flanges 11 and 12 form the hub and the slotted flange 8 forms the spider. When the hub is rolled or bent to tubular form as shown in Fig. 14 the spider arms 10 are extended at right angles to each other and the notches 13 are diametrically opposite as shown.

This form as shown in Fig. 14 is for the lower fan belt pulley which is secured to the main shaft of an automobile engine and the notches 13 are adapted to be engaged by the engine crank when the engine is cranked by hand. This is merely an illustration of one use of a hub which extends on opposite sides of a spider and there are, of course, many other uses for this form of the device. When the ends 14 of the hub shown in Fig. 13 are brought together to abutment they are welded to hold the hub in the rolled form. When the device has been formed as shown in Fig. 14 the arms 10 are then formed as shown in Fig. 3 with down-turned ends 15 which are spot welded or otherwise secured to a pulley rim 16 or other rim or felloe member.

It is evident from the foregoing that a standard angle iron or standard T iron member may be used with equal facility in the manufacture of a wheel after the plan herein disclosed. It is also well known that the parts of the T bar are known as the flange and the stem and that the two legs of the angle may be equal or unequal and in the case of the T iron the stem 10 of Fig. 12 is slotted to form the spokes of the wheel and in the case of an angle iron one leg or flange is slotted and the other leg or flange provides the hub of the wheel.

From the foregoing description it becomes evident that by this method a wheel hub and spider may be easily and cheaply formed, provides a method of manufacture in which the hub and spider are formed integrally and provides a device which accomplishes the objects described.

Having thus fully described my invention, its utility and mode of operation, what I claim and desire to secure by Letters Patent of the United States is—

1. The method of making a wheel consisting in the provision of a length of metal of T form section, transversely slotting the stem of the T section to form spoke like portions, rolling the flange to bring the ends to abutment to provide a hub and to thereby spread the said spoke like portions to a radial relation, welding the abutted ends of the hub portion, and finally securing a rim to the radial spoke like portions.

2. The method of making a wheel which consists in slotting one flange of a standard form of metal having two flange like portions one practically at a right angle to the other, the said slots extending from the edge of one flange toward the meeting point of the flanges in the form of a V to form tapered spokes then rolling the other flange about an axis parallel to its plane to bring the ends thereof to abutment to form a cylindrical hub and thereby spread the spoke like portions of the slotted flange to radial relation, welding the said abutted ends of the one flange, and finally securing a rim to the spoke like portions of the other flange.

In testimony whereof I sign this specification.

REYNOLD G. NELSON.